United States Patent [19]

Tuttle et al.

[11] Patent Number: 4,877,352

[45] Date of Patent: Oct. 31, 1989

[54] METHOD AND APPARATUS FOR CONTROL OF AN UPSTREAM WATER LEVEL

[75] Inventors: Gary M. Tuttle, Tulare; Steven DeShaw, Three Rivers, both of Calif.

[73] Assignee: Waterman Industries, Inc., Exeter, Calif.

[21] Appl. No.: 309,471

[22] Filed: Feb. 10, 1989

[51] Int. Cl.$^4$ .............................................. E02B 7/28
[52] U.S. Cl. .................................... 405/104; 405/87; 405/100; 405/106
[58] Field of Search ...................... 405/87, 92, 94, 95, 405/96, 99, 100, 101, 104, 105, 106

[56] References Cited

U.S. PATENT DOCUMENTS

| | | | |
|---|---|---|---|
| 544,425 | 8/1895 | Bruce et al. | 405/100 |
| 585,875 | 6/1897 | Pope | 405/106 |
| 648,312 | 4/1900 | Taylor | 405/93 |
| 973,172 | 10/1910 | Collar | 405/97 |
| 1,587,616 | 6/1926 | Sudley | 405/100 |
| 1,918,015 | 7/1933 | Broome | 405/106 X |
| 2,984,074 | 5/1961 | Le Clair et al. | 405/106 |
| 3,354,655 | 11/1967 | Armond | 405/104 X |
| 3,695,043 | 10/1972 | Vallet | 405/97 |
| 4,027,487 | 6/1977 | Alexandre | 405/97 |
| 4,405,458 | 9/1983 | McHugh | 405/97 X |
| 4,726,709 | 2/1988 | Labelle | 405/106 X |

FOREIGN PATENT DOCUMENTS

| | | | |
|---|---|---|---|
| 1064432 | 8/1959 | Fed. Rep. of Germany | 405/100 |
| 38759 | 5/1956 | Poland | 405/106 |
| 156368 | 10/1932 | Switzerland | 405/106 |

OTHER PUBLICATIONS

The AMIL Constant Upstream Level Gate Publication, 1987.

*Primary Examiner*—Dennis L. Taylor
*Attorney, Agent, or Firm*—Limbach, Limbach & Sutton

[57] ABSTRACT

A method and apparatus for controlling an upstream water level by adjusting the elevation of a trough assembly of a weir. The weir is a open frame within which is slidably mounted a trough assembly, which may be raised or lowered by means of a tandem screw jack assembly, which caps the open frame. The perimeter of the open frame is lined with a continuous J-shaped neoprene seal, which provides a smooth slidable surface for movement of the trough assembly. The J-shaped seal also provides a substantially water tight barrier between the trough assembly and the open frame. Two vertical screw shafts extend downwardly from the tandem screw jack assembly and are bolted to the trough assembly. By rotating a hand crank, the vertical screw shafts raise or lower the trough assembly.

15 Claims, 3 Drawing Sheets

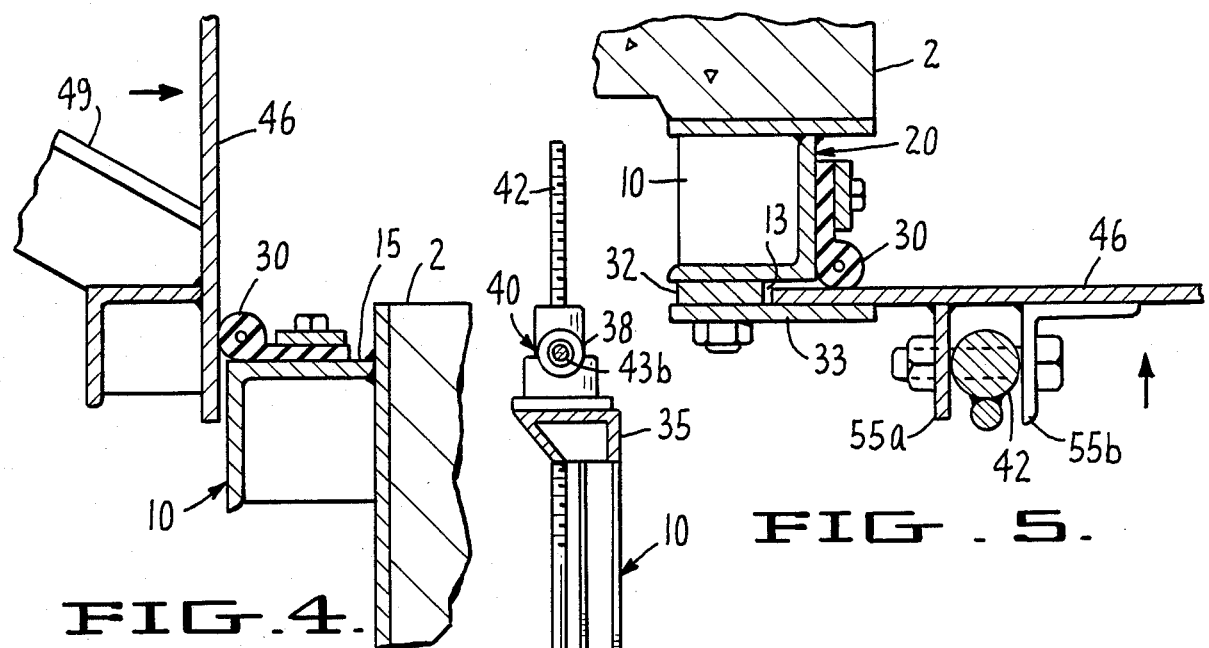
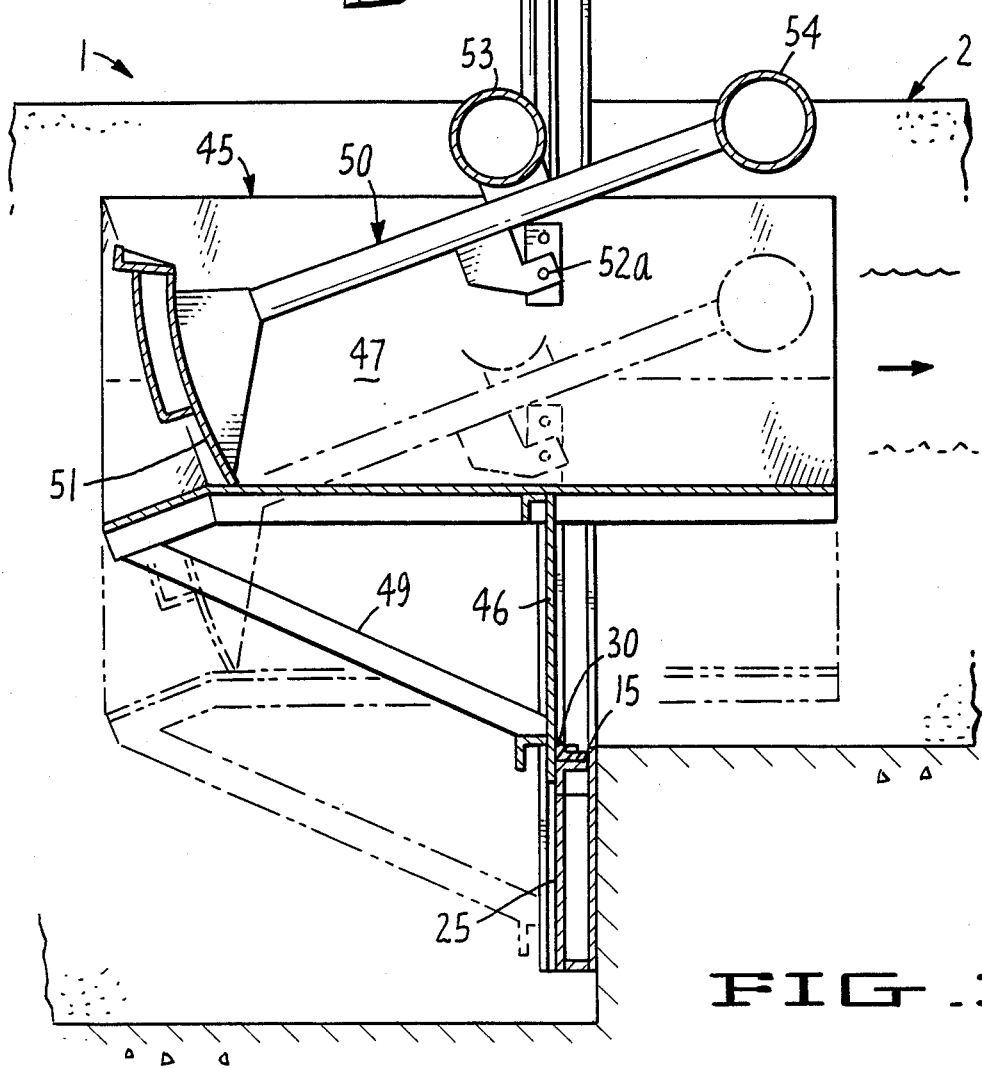

METHOD AND APPARATUS FOR CONTROL OF AN UPSTREAM WATER LEVEL

TECHNICAL FIELD

The present invention is directed generally to an adjustable weir, and more particularly to an improved adjustable weir of the AMIL type which allows the user to control an upstream water level by adjusting the elevation of the trough assembly of the weir.

BACKGROUND OF THE INVENTION

Weirs have been used for many years to control the level of water in aqueducts, channels or canals. Early weirs were simple gates which were lowered or raised to control the level of water upstream from the weir, to prevent flooding and overtopping of the canal's banks.

These weirs had many disadvantages, such as the need to continually monitor the level of water upstream from the weir in order to determine whether the gate should be closed or opened further. Furthermore these weirs were cumbersome to operate, often requiring two individuals on either side of the weir to raise or lower the gate. Moreover as many of these weirs were constructed of wood or metal, the gates often jammed due to material failure such as warping or metal deterioration. Also due to such material failure, water leakage between the gate and weir, and from the weir itself, often occurred, leading to the uncontrollable release of water through the weir. Finally, the elevation of these weirs could not be altered in response to lower or higher upstream water levels as they were permanent and immovable structures.

More recently weirs have been developed which may either be installed in an aqueduct, channel or canal or else float on a body of water. The latter type of weir is often used as "skimmer," for the removal or separation of surface debris, films, scum or secondary liquids from a primary liquid body.

These weirs incorporate an AMIL type gate which is pivotally centered on an axis of rotation with ballast containers opposite the gate. These containers may be filled or emptied. These gates of the AMIL type, which are disclosed in U.S. Pat. Nos. 3,643,443; 3,683,630; and 4,027,487 to Alexandre, maintain the upstream water level at the elevation of the axis of rotation. Once the gate is installed and the ballast containers counterpoised, the torques generated by the hydraulic thrust of the upstream water on the gate and the weight of the gate are equal and the gate opens and closes in relation to the elevation of the pivot axis and the upstream water level.

By design, these gates do not lend themselves to convenient adjustment of the controlled upstream water level. Once the gate is installed and balanced, the controlled water level can only be changed by shifting ballast from one container to the other and the amount of adjustment is very limited. Therefore if the upstream water level decreases below a certain level, the AMIL type gate is inoperative.

SUMMARY OF THE INVENTION

The foregoing and other problems of prior methods and devices for controlling upstream water levels are overcome by the present invention of an improved adjustable weir of the AMIL type, including a open frame capable of installation in a aqueduct, channel or canal, an adjustable trough assembly for controlling the upstream water level and means for slidably adjusting the elevation of the trough assembly by a screw-jack assembly and a J-shaped seal.

It is therefore an object of the present invention to provide for an easily adjustable weir which allows the selective control of an upstream water level.

It is a further object of the present invention to provide for an adjustable weir wherein the elevation of the trough assembly of the weir may be slidably vertically raised or lowered, in relation to the upstream water level.

It is yet another object of the present invention to provide for an adjustable weir wherein the sliding element of the weir slides against a J-shaped neoprene seal.

It is a further object of the present invention to provide for an adjustable weir wherein the J-shaped neoprene seal is a substantially water tight barrier, allowing water only to pass through the trough portion of the trough assembly.

These and other features, objectives and advantages of the present invention will be more readily understood upon consideration of the following detailed description of certain embodiments of the present invention and the drawings.

BRIEF DESCRIPTION OF THE DRAWINGS

FIG. 3 is a cross-sectional view of the improved adjustable weir, taken on the plane designated by the line 3—3 of FIG. 1, with the trough depicted in different elevations.

FIG. 4 is a cross-sectional view of a portion of the improved adjustable weir, taken along the plane designated by the line 4—4 in FIG. 2.

FIG. 5 is a cross-sectional view of another portion of the improved adjustable weir, taken along the plane designated by the line 5—5 in FIG. 2.

DESCRIPTION OF THE PREFERRED EMBODIMENT

Figure 1:
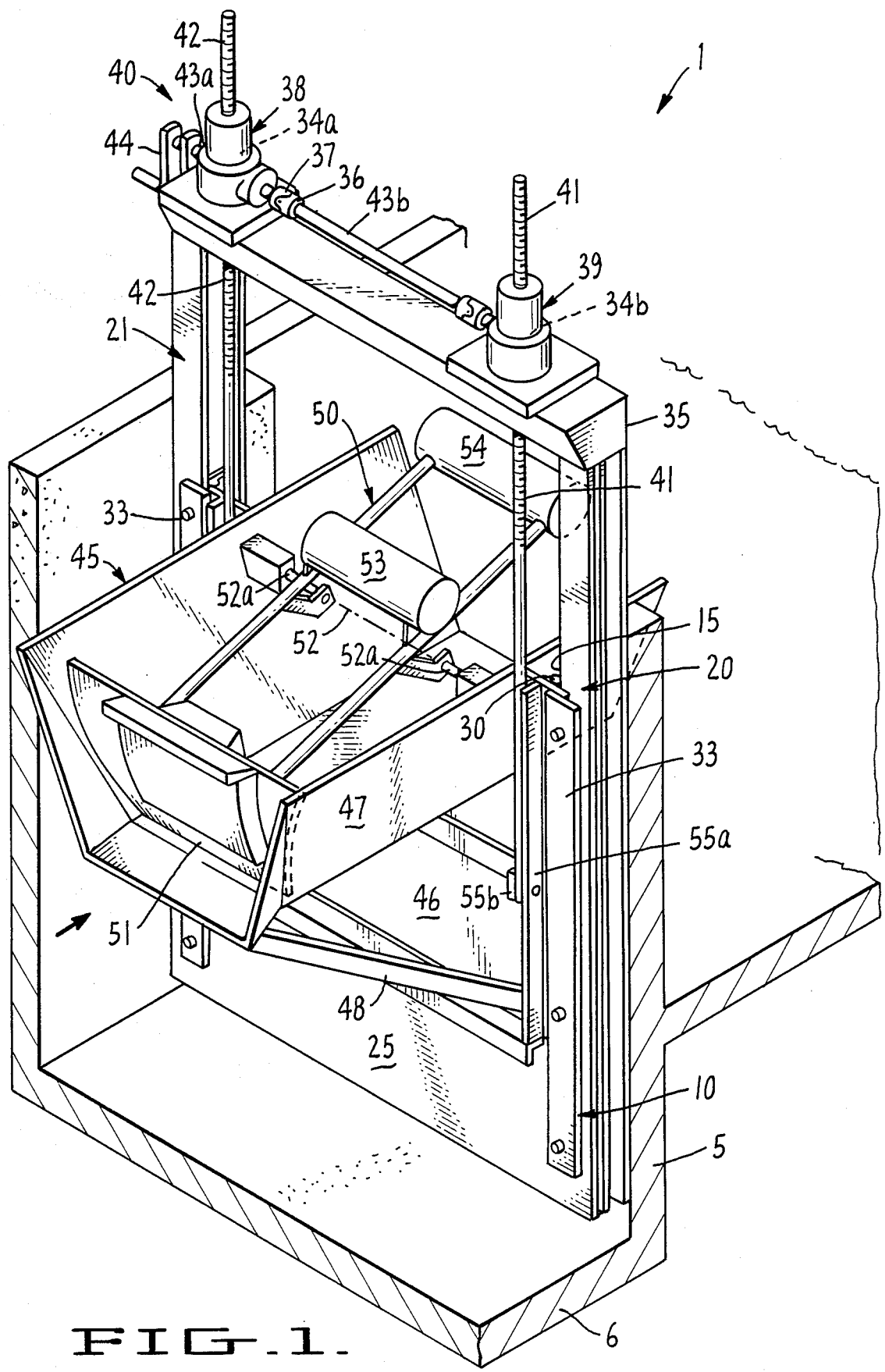
FIG. 1 is a perspective view of an improved adjustable weir in accordance with the present invention.
Figure 2:
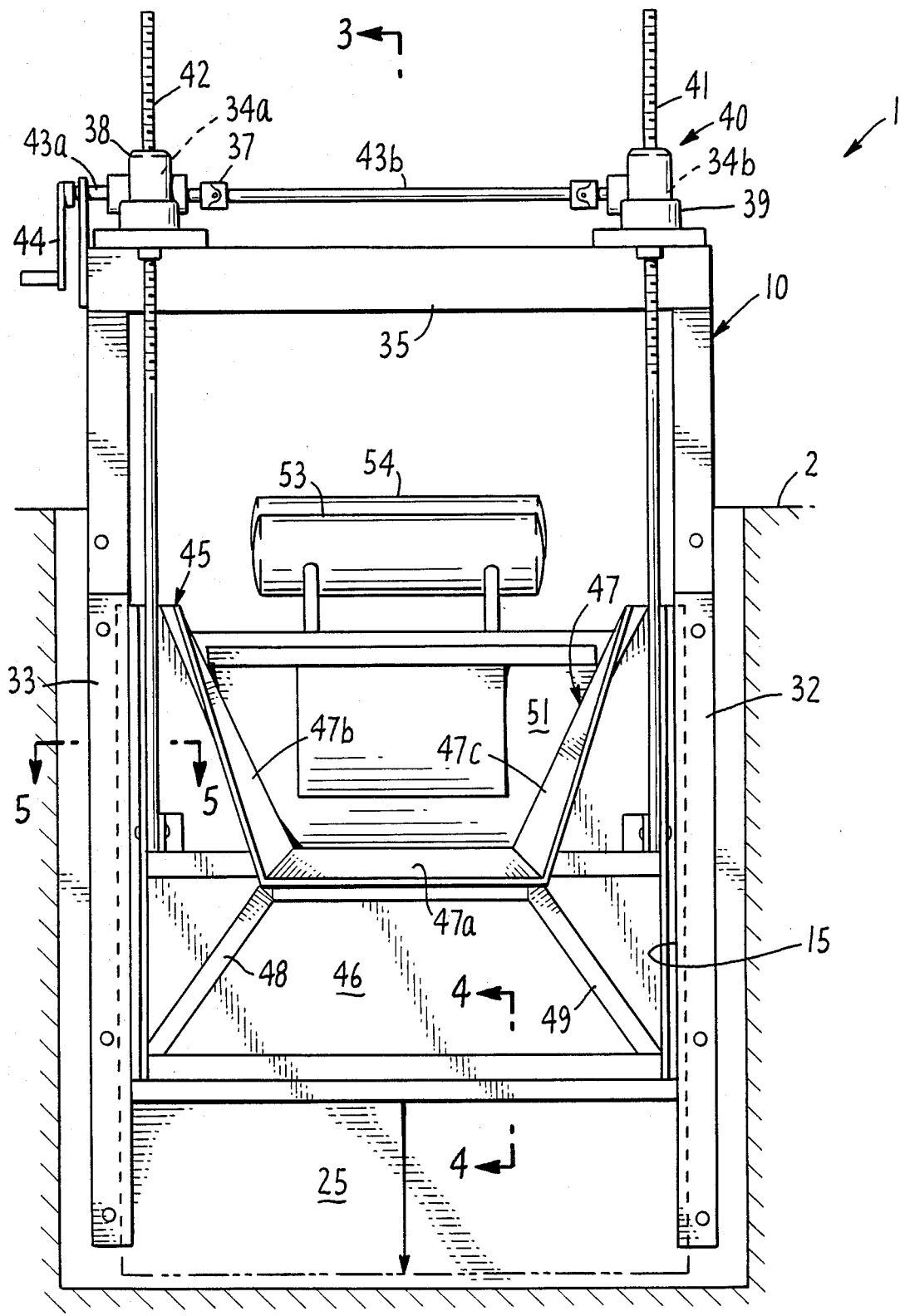
FIG. 2 is a front elevational view of the improved adjustable weir shown in FIG. 1.

Referring now to the drawings with particular reference to FIGS. 1 and 2, there is shown an adjustable weir 1 in accordance with the present invention. The adjustable weir 1 includes a frame 10 which may be installed in any water bearing conduit such as an aquaduct, channel or canal 2. Frame 10 is permanently secured to the sidewalls 5 and bottom 6 of aqueduct 2.

Frame 10 is open and is generally a rectangular U-shape. Two vertical side rails generally designated 20 and 21 and a base 25 comprise frame 10. Frame 10 may be of varying thickness and height, the exact manufacturing specifications varying with individual user requirements. Frame 10 is constructed of structural steel, though any rigid and durable metal alloy may be used.

Frame 10 is capped by filler bar headrail 35. Filler bar headrail 35 is of dual angle or channel set configuration. Filler bar headrail 35 is constructed of structural steel, though other types of suitable durable and rigid materials may also be used.

A tandem screw jack assembly 40 is bolted to the upper face of filler bar headrail 35 by means of two lift housings generally designated 38 and 39. A first vertical screw shaft 41 extends downwardly from one end of tandem screw jack assembly 40 through filler bar headrail 35; and a second vertical screw shaft 42 extends downwards in substantially the same manner at the opposite end of tandem screw jack assembly 40. A connecting shaft 43b extends between and engages vertical screw shafts 41 and 42 by means of a key 36 engaged with a coupling 37. A hand crank 44 engages an input shaft 43a which in turn drives two gear driven lift nuts 34a and 34b located within lift housings 38 and 39, respectively. Vertical screw shafts 41 and 42 engage gear driven lift nuts 34a and 34b and are raised and lowered by applying rotational force to hand crank 44.

Frame 10 and filler bar headrail 35 form an opening 15. A spacer bar 32 and a cover guide 33 are bolted to each vertical side rail 20, 21 of frame 10; forming a groove 13 (See FIG. 5). A trough assembly 45 is slidably mounted within the grooves 13 through a generally rectangularly shaped support plate 46 forming part of the assembly. The upper portion of support plate 46 carries a trapazoidal-shaped trough 47. Trough 47 has a bottom 47a and two side walls 47b and 47c both of which are at an angle relative to the horizontal plane formed by bottom 47a. Trough 47 nests within support plate 46 and has a length dimension which is substantially greater than the width dimension of support plate 46. Trough 47 is supported by a pair of braces 48 and 49, welded to support plate 46.

Pivotally mounted within trough 47 is an AMIL gate type sluice 50. Sluice 50 pivots on an axis of rotation 52 provided by shafts 52a. A sector-shaped gate leaf 51 is positioned on one side of the axis of rotation 52, with a cylinder-shaped ballast container 53 which is integral to sluice 50 centered on the axis of rotation 52. A second cylinder-shaped ballast container 54 is disposed at the opposite end of axis of rotation 52 from sector-shaped gate leaf 51.

Trough assembly 45 is slidably retained in groove 13 by spacer bar 32 and cover guide 33 and is sealed by a single continuous J-shaped seal 30. J-shaped seal 30 lines the perimeter of opening 15 of frame 10. The vertical sides of the plate 46 slide between spacer bar 32, cover guide 33 and J-shaped seal 30. J-shaped seal 30 is bolted to and is contiguous with the perimeter of opening 15 of frame 10.

FIG. 3 illustrates the adjustability of the elevation of trough assembly 45 of the present invention. The position of trough assembly 45 may be adjusted to set the elevation of the upstream water level. When it is contemplated that the elevation of the upstream water level be dropped to a point lower than the elevation of axis of rotation 52, the elevation of trough assembly 45 may be adjusted to lower the upstream level. Conversely if the upstream water level is to be raised higher than axis of rotation 52, trough assembly 45 is raised.

Trough assembly 45 is raised by rotatably moving hand crank 44. Vertical screw shafts 41 and 42 are driven by gear driven lift nuts 34a and 34b which are connected to hand crank 44 by means of shafts 43a and 43b. By rotating hand crank 44, the gear driven lift nuts 34a and 34b screw vertical screw shafts 41 and 42 upwards or downwards.

FIG. 4 is a side view of a portion of the present invention depicted in FIG. 2 along the plane designated by line 4—4. Support plate 46 rests against the bulbous portion of J-shaped seal 30, which has been bolted to the perimeter of opening 15 in frame 10. J-shaped seal 30 provides a smooth slidable surface upon which support plate 46 and hence trough assembly 45 may move. J-shaped seal 30 also provides a seal between trough assembly 45 and frame 10 to substantially prevent water leakage through opening 15.

FIG. 5 depicts another view of a portion of FIG. 2 along the plane designated by line 5—5. There it can be seen that support plate 46 slides between cover guide 33 and J-shaped seal 30. Vertical screw shafts 41 and 42 are bolted to support plate 46 by means of stem brackets 55a and 55b.

The terms and expressions which have been employed herein are used as terms of description and not of limitation, and there is no intention, in the use of such terms and expressions, of excluding any equivalence of the feature shown and described, or portions thereof, it being recognized that various modifications are possible with the scope of the invention claimed.

We claim:

1. In an improved adjustable weir for the control of upstream water levels, allowing the flow of water at a level complementary to the upstream water level, the improvement comprising:
   1. an open frame;
   2. a trough assembly mounted within said open frame for vertical movement relative thereto, said assembly having a support plate with an upper portion forming a trough;
   3. a sluice pivotally mounted to said plate for movement about an axis of rotation, said sluice comprising:
      a. a sector-shaped gate leaf to one side of said axis of rotation;
      b. two ballast containers, one of said ballast containers centered on said axis of rotation and the second of said ballast containers disposed on the opposite side of said axis from said gate; and
   4. means for raising or lowering said trough assembly, said means comprising a tandem screw jack assembly fixedly mounted to said open frame wherein said trough assembly may be raised or lowered by means of said screw jack assembly.

2. An improved adjustable weir according to claim 1 wherein said open frame is a rectangular U-shape with two vertical side rails.

3. An improved adjustable weir according to claim 2 wherein said open frame is capped with a filler bar headrail and said tandem screw jack assembly is mounted to said headrail by means of dual lift housings.

4. An improved adjustable weir according to claim 3 wherein said tandem screw jack assembly comprises two vertical screw shafts extending downwardly through said filler bar headrail, one screw shaft disposed at one end of said filler bar headrail and the other screw shaft disposed at the opposite end of said filler bar headrail.

5. An improved adjustable weir according to claim 4 wherein a connecting shaft extends between and engages said vertical screw shafts by means of a key and a input shaft.

6. An improved adjustable weir according to claim 5 wherein said connecting shaft is rotated by means of a hand crank.

7. An improved adjustable weir according to claim 6 wherein said connecting shaft engages two gear-driven lift nuts, each of said lift nuts located with said dual lift housings, said lift nuts driving said vertical screw shafts.

8. An improved adjustable weir according to claim 4 wherein said vertical screw shafts are fixedly bolted to said trough assembly, by means of dual stem brackets.

9. An improved adjustable weir according to claim 1 wherein the perimeter of said open frame is lined with a continuous J-shaped seal engaged with said support plate.

10. An improved adjustable weir according to claim 9 wherein said trough assembly is slidably mounted within said open frame by means of said continuous J-shaped seal, a spacer bar and a cover guide, said spacer bar and said cover guide bolted to said vertical side rails of said frame.

11. An improved adjustable weir according to claim 10 wherein said spacer bar and said cover guide form a groove such that the edges of said support plate slide between said spacer bar, said cover guide and said continuous J-shaped seal.

12. An improved adjustable weir according to claim 9 wherein said trough assembly may be raised or lowered by means of said screw jack assembly, said continuous J-shaped seal providing a smooth slidable guide for said trough assembly.

13. An improved adjustable weir according to claim 9 wherein said J-shaped seal is composed of neoprene, providing a substantially water tight seal between said trough assembly and said frame.

14. A method for adjusting a weir for the control of upstream water levels, the method comprising:

slidably mounting a trough assembly within an open frame having a filler bar headrail;

adjusting the elevation of said trough assembly by means of a tandem screw jack assembly, said tandem screw jack assembly being mounted to said filler bar headrail and having two vertical screw shafts extending downwardly from said filler bar headrail and bolted to said trough assembly;

rotating a hand crank connected to said vertical screw shafts; and raising or lowering said trough assembly by said vertical screw shafts of said tandem screw jack assembly, so that the elevation of said trough assembly is comparable to the elevation of the upstream water level.

15. In an improved adjustable weir for the control of upstream water levels, the improvement comprising:

1. a rectangular U-shaped open frame capable of installation in a water bearing aqueduct, channel or canal, said open frame having two vertical side rails and capped with a filler bar headrail;
2. a trough assembly slidably mounted within said open frame, said trough assembly including a support plate, the upper portion of which forms a trough;
3. an sluice pivotally mounted on said trough about an axis of rotation, said sluice gate comprising:
   a. a sector-shaped gate leaf positioned on one side of said axis of rotation, a first ballast container centered on said axis of rotation and a second ballast container at the opposite end of said axis from said gate; and
4. a tandem screw jack assembly, mounted to said filler bar headrail of said frame, said tandem screw jack assembly having two vertical screw shafts extending downwardly from said filler bar headrail and fixedly bolted to said support plate of said trough assembly, whereby the elevation of said trough assembly may be raised or lowered in relation to the elevation of the upstream water level.

* * * * *